(12) United States Patent
Inoue (10) Patent No.: US 8,044,641 B2
(45) Date of Patent: Oct. 25, 2011

(54) STEP-DOWN SWITCHING REGULATOR WITH TURN OFF UNDERSHOOT PREVENTION

(75) Inventor: Yoshiyuki Inoue, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 452 days.

(21) Appl. No.: 12/364,748

(22) Filed: Feb. 3, 2009

(65) Prior Publication Data

US 2009/0213631 A1    Aug. 27, 2009

(30) Foreign Application Priority Data

Feb. 27, 2008  (JP) ................................. 2008-046023

(51) Int. Cl.
*G05F 3/16*  (2006.01)
(52) U.S. Cl. .......................... 323/224; 323/271; 323/351
(58) Field of Classification Search .................. 323/223, 323/224, 271, 282, 351
See application file for complete search history.

(56) References Cited

U.S. PATENT DOCUMENTS

| | | | | |
|---|---|---|---|---|
| 6,215,286 B1 * | 4/2001 | Scoones et al. | ............... | 323/222 |
| 6,281,665 B1 * | 8/2001 | Miyaba et al. | ................ | 323/224 |
| 7,202,644 B2 * | 4/2007 | Nitta et al. | .................... | 323/259 |
| 7,242,168 B2 * | 7/2007 | Muller et al. | ................. | 323/222 |
| 7,501,802 B2 * | 3/2009 | Nitta et al. | .................... | 323/259 |
| 7,812,578 B2 * | 10/2010 | Sugahara et al. | ............ | 323/224 |

FOREIGN PATENT DOCUMENTS

| | | |
|---|---|---|
| JP | 2004-336972 | 11/2004 |
| JP | 2006-34033 | 2/2006 |
| JP | 2006-121845 | 5/2006 |
| JP | 2006-246626 | 9/2006 |
| JP | 2007-82347 | 3/2007 |
| JP | 2007-110833 | 4/2007 |
| JP | 2007-202273 | 8/2007 |
| JP | 2007-202281 | 8/2007 |
| JP | 2007-209103 | 8/2007 |
| JP | 2007-209135 | 8/2007 |
| JP | 2007-209180 | 8/2007 |
| JP | 2007-241411 | 9/2007 |
| JP | 2007-252137 | 9/2007 |
| JP | 2007-288863 | 11/2007 |
| JP | 2008-72786 | 3/2008 |
| JP | 2008-72833 | 3/2008 |
| JP | 2008-72835 | 3/2008 |
| JP | 2008-131746 | 6/2008 |
| JP | 2008-131747 | 6/2008 |
| JP | 2008-178263 | 7/2008 |
| JP | 2008-206366 | 9/2008 |
| JP | 2008-228514 | 9/2008 |

* cited by examiner

*Primary Examiner* — Jeffrey Sterrett
(74) *Attorney, Agent, or Firm* — Cooper & Dunham LLP (57) ABSTRACT

A step-down switching regulator prevents an output voltage undershoot and enables a quick lowering of an output voltage immediately after turning off of power supply. The step-down switching regulator includes an NMOS transistor connected between an output terminal and a ground voltage and another NMOS transistor connected in parallel with a synchronous rectification transistor. Upon reception of an on/off signal for terminating the operation of the switching regulator, the NMOS transistors are turned on into an on-state.

5 Claims, 6 Drawing Sheets

STEP-DOWN SWITCHING REGULATOR WITH TURN OFF UNDERSHOOT PREVENTION

BACKGROUND OF THE INVENTION

1. Field of the Invention

The present invention generally relates to step-down switching regulators for supplying power to electronic devices. Particularly, the invention relates to technologies for protecting a power supply circuit and a load circuit upon termination of power supply by quickly lowering a voltage applied to an electronic circuit and preventing the development of an output voltage undershoot due to an inductor.

2. Description of the Related Art

When an operation of a power supply circuit supplying power to a load is stopped, it is necessary to quickly lower the voltage inputted to the load. This is because a delay in lowering the applied voltage may lead to an extended application of a low voltage outside a guaranteed operation range to a load electronic circuit, resulting in a malfunction of the electronic circuit or other unexpected troubles.

In high-efficiency power supply circuits used for small electronic devices, a non-insulated type switching regulator employing an inductor is widely used. In this type of power supply circuits, the use of the inductor may lead to the development of a high voltage across the inductor unless a path is provided for discharging the energy stored in the inductor after turning off of power supply. Such a high voltage often causes malfunctioning or other troubles of the electronic components of the power supply circuit or an electronic circuit connected to an output terminal.

Japanese Laid-Open Patent Application No. 2007-288863 (hereafter referred to as "Patent Document 1") discusses a technology whereby the charge stored in an output capacitor is discharged by causing a first switching element in a switching regulator of which one end is connected to ground voltage to turn on when the load circuit is turned off.

Japanese Laid-Open Patent Application No. 2004-336972 (to be hereafter referred to as "Patent Document 2") discusses a technology wherein a series circuit of a resistor and a transistor is connected in parallel with a synchronous rectification switching element. The transistor is turned on after turning off of power supply in order to prevent an undershoot that develops at a power-supply-side terminal of an inductor upon turning off of power supply.

In the switching regulator according to Patent Document 1, the first switching element functions as a switching element for synchronous rectification. Immediately after turning off of power supply, both the main switching element and the synchronous rectification switching element are turned off. As a result, a large negative voltage is produced at the power-supply-side terminal of the inductor immediately after turning off of power supply.

Because the aforementioned negative voltage is applied across the synchronous rectification switching element, a current flows from the ground voltage to the inductor via a parasitic diode of the synchronous rectification switching element. However, if the power supply is turned off by the activation of an overcurrent protection function or the like, the parasitic diode may be destroyed by the large energy stored in the inductor. The destruction of the parasitic diode leads to a loss of the function of the synchronous rectification switching element, resulting in a failure of the power supply circuit per se.

In the switching regulator according to Patent Document 2, the charge stored in the output capacitor is discharged via the inductor and the resistor, so that it takes time for the output voltage to decrease after turning off of power supply. Thus, there remains the problem of the extended application of a low voltage outside a guaranteed operation range to an electronic circuit connected to the output terminal.

SUMMARY OF THE INVENTION

It is therefore a general object of the present invention to provide a step-down switching regulator whereby one or more of the aforementioned problems of the prior art are eliminated.

A more specific object is to provide a step-down switching regulator whereby the undershoot of an output voltage immediately after turning off of power supply can be prevented and the output voltage can be lowered quickly.

According to one embodiment of the present invention, a synchronous-rectification-type step-down switching regulator converts an input voltage at an input terminal of the switching regulator into a predetermined constant voltage that is applied to a load connected at an output terminal of the switching regulator.

The switching regulator includes a first switching element configured to perform a switching in accordance with a control signal; an inductor that is charged by the input voltage when the first switching element performs the switching; a second switching element for synchronous rectification configured to discharge the inductor by performing a switching in accordance with the control signal; a control circuit unit configured to control the switching of the first switching element in order to obtain the predetermined constant voltage at the output terminal, the control circuit also being configured to cause the second switching element to perform the switching in an opposite manner to the switching of the first switching element; and a short-circuiting unit configured to connect the output terminal to a ground voltage and also short-circuit the second switching element when the control circuit unit is deactivated.

In another embodiment, a synchronous-rectification-type step-down switching regulator for converting an input voltage at an input terminal of the switching regulator into a predetermined constant voltage that is applied to a load connected at an output terminal of the switching regulator includes a first switching element configured to perform a switching in accordance with a control signal; an inductor that is charged by the input voltage when the first switching element performs the switching; a second switching element for synchronous rectification configured to discharge the inductor by performing a switching in accordance with the control signal; a control circuit unit configured to control the switching of the first switching element in order to obtain the predetermined constant voltage at the output terminal, the control circuit also being configured to cause the second switching element to perform the switching in an opposite manner to the switching of the first switching element; a short-circuiting unit configured to connect the output terminal to a ground voltage when the control circuit unit is deactivated; and a voltage detecting circuit unit configured to detect a voltage at a connecting portion between the inductor and the second switching element.

The voltage detecting circuit unit, when the voltage at the connecting portion between the inductor and the second switching element is a negative voltage, turns on the second switching element into a conducting state upon reception of an external signal for terminating the operation of the control circuit unit.

In another embodiment, a synchronous-rectification-type step-down switching regulator for converting an input voltage at an input terminal of the switching regulator into a predetermined constant voltage that is applied to a load connected at an output terminal of the switching regulator includes a first switching element configured to perform a switching in accordance with a control signal; an inductor that is charged by the input voltage when the first switching element performs the switching; a second switching element for synchronous rectification configured to discharge the inductor by performing a switching in accordance with the control signal; a control circuit unit configured to control the switching of the first switching element in order to obtain the predetermined constant voltage at the output terminal, the control circuit also being configured to cause the second switching element to perform the switching in an opposite manner to the switching of the first switching element; a short-circuiting unit configured to connect the output terminal to a ground voltage when the control circuit unit is deactivated; and an inverse current detection circuit unit configured to turn off the second switching element into a shutdown state upon detection of an inverse current that flows from the output terminal to the second switching element.

Upon reception of an external signal for terminating the operation of the control circuit unit, the inverse current detection circuit unit turns on the second switching element into a conducting state when a voltage at a connecting portion between the inductor and the second switching element is a negative voltage.

BRIEF DESCRIPTION OF THE DRAWINGS

These and other objects, features and advantages of the invention will be apparent to those skilled in the art from the following detailed description of the invention, when read in conjunction with the accompanying drawings in which.

DETAILED DESCRIPTION OF THE PREFERRED EMBODIMENTS

In the following, preferred embodiments of the present invention are described with reference to the drawings.

Figure 1:
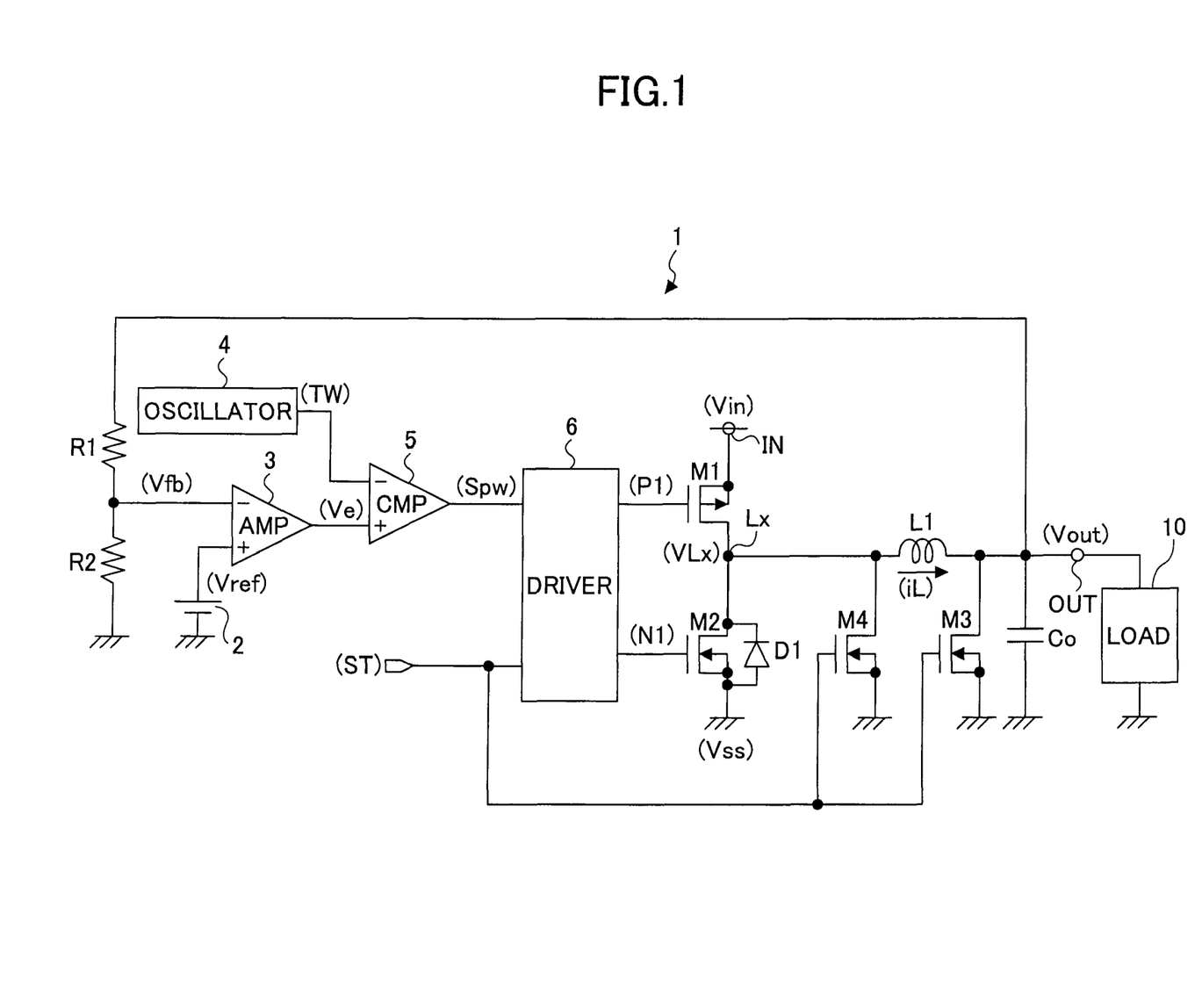
FIG. 1 shows a circuit diagram of a step-down switching regulator according to a first embodiment of the present invention.

FIG. 1 shows a circuit diagram of a step-down switching regulator 1 according to a first embodiment of the present invention.

The step-down switching regulator 1 is of a synchronous rectification type whereby an input voltage Vin at an input terminal IN is converted into a predetermined constant voltage in order to produce an output voltage Vout at an output terminal OUT that is applied to a load 10.

The switching regulator 1 includes a switching transistor M1 and a synchronous rectification transistor M2. The switching transistor M1, which is a PMOS transistor, performs a switching operation for an output control for the input voltage Vin. The synchronous rectification transistor M2 is a NMOS transistor.

The switching regulator 1 further includes a reference voltage generating circuit 2; resistors R1 and R2 for output voltage detection; an inductor L1; an output capacitor Co; an error amplifying circuit 3; an oscillating circuit 4; a pulse wave modulation (PWM) comparator 5; a driver circuit 6; and NMOS transistors M3 and M4.

The switching transistor M1 provides a first switching element, while the synchronous rectification transistor M2 provides a second switching element. The reference voltage generating circuit 2, the resistors R1 and R2, the error amplifying circuit 3, the oscillating circuit 4, the PWM comparator 5, and the driver circuit 6 constitute a control circuit unit. The NMOS transistors M3 and M4 constitute a short-circuiting unit, in which the NMOS transistor M3 provides a first short-circuiting switching element and the NMOS transistor M4 provides a second short-circuiting switching element. The individual circuits other than the inductor L1 and the capacitor C1 may be integrated into a single integrated circuit (IC).

The reference voltage generating circuit 2 generates and outputs a predetermined reference voltage Vref. The output-voltage-detecting resistors R1 and R2 divide the output voltage Vout to produce a divided voltage Vfb. The error amplifying circuit 3 amplifies a voltage difference between the input divided voltage Vfb and the reference voltage Vref to produce an error voltage Ve.

The oscillating circuit 4 produces and outputs a predetermined triangular wave signal TW. The PWM comparator 5 generates and outputs a pulse signal Spw for PWM control from the error voltage Ve from the error amplifying circuit 3 and the triangular wave signal TW. The driver circuit 6 produces control signals P1 and N1 based on the input pulse signal Spw. The driver circuit 6 then outputs the control signals P1 and N1 to the corresponding gate of the switching transistor M1 and the synchronous rectification transistor M2 in order to control the driving of the switching transistor M1 and the synchronous rectification transistor M2.

The switching transistor M1 and the synchronous rectification transistor M2 are connected in series between the input terminal IN and the ground voltage Vss. The connecting portion between the switching transistor M1 and the synchronous rectification transistor M2 is designated Lx. The inductor L1 is connected between the connecting portion Lx and the output terminal OUT.

Between the output terminal OUT and the ground voltage Vss, the resistors R1 and R2 are connected in series. The output capacitor Co is also connected between the output terminal OUT and the ground voltage Vss. The divided voltage Vfb is obtained at the connecting portion between the resistors R1 and R2. In the error amplifying circuit 3, the inverting input terminal is supplied with the divided voltage Vfb while the non-inverting input terminal is supplied with the reference voltage Vref. The output terminal of the error amplifying circuit 3 is connected to the non-inverting input terminal of the PWM comparator 5.

The inverting input terminal of the PWM comparator 5 is supplied with the triangular wave signal TW. The pulse signal Spw outputted by the PWM comparator 5 is supplied to one of the input terminals of the driver circuit 6. The gate of each of the switching transistor M1 and the synchronous rectification transistor M2 is connected to the corresponding output terminal of the driver circuit 6, so that the corresponding control signal P1 or N1 is supplied to the gate.

The NMOS transistor M3 is connected between the output terminal OUT and the ground voltage Vss. The NMOS transistor M4 is connected between the connecting portion Lx and the ground voltage Vss. The other input terminal of the driver circuit 6 and the gate of each of the NMOS transistors M3 and M4 are supplied with an on/off signal ST that is externally inputted for an on/off control of the switching regulator 1. The diode D1 is a parasitic diode that is formed when the synchronous rectification transistor M2 is implemented on an IC chip.

Figure 2:
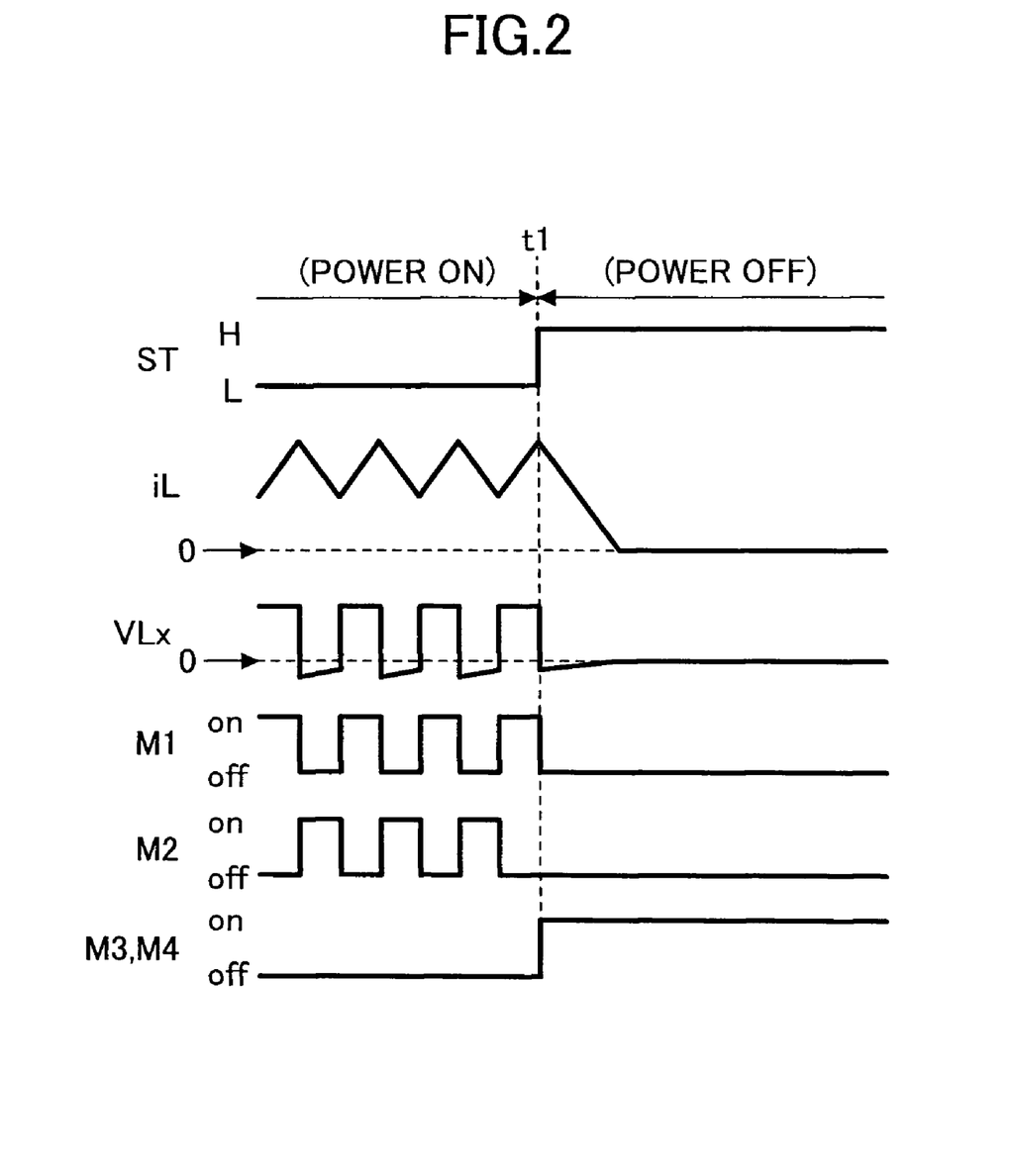
FIG. 2 shows a timing chart illustrating waveforms of various signals in the switching regulator shown in FIG. 1.

FIG. 2 shows a timing chart illustrating examples of each of the signals in the switching regulator 1 shown in FIG. 1. iL indicates an inductor current that flows in the inductor L1. VLx indicates a voltage at the connecting portion Lx. M1 through M4 indicate the operation of each of the transistors M1 through M4.

With reference to FIG. 2, an operation of the switching regulator 1 shown in FIG. 1 is described. When the on/off signal ST is at a low level ("L"), the switching regulator 1 is activated. When the on/off signal ST is at a high level ("H"), the switching regulator 1 is deactivated.

When the on/off signal ST is at low level, the driver circuit 6 is activated while the NMOS transistors M3 and M4 are turned off into a shutdown state. In this state, as the output voltage Vout of the switching regulator 1 increases, the error voltage Ve outputted by the error amplifying circuit 3 decreases, so that the duty cycle of the pulse signal Spw outputted by the PWM comparator 5 is reduced. As a result, the time in which the switching transistor M1 is on becomes shorter. Correspondingly, the time in which the synchronous rectification transistor M2 is on becomes longer, so that the output voltage Vout of the switching regulator 1 decreases.

As the output voltage Vout of the switching regulator 1 decreases, the error voltage Ve of the error amplifying circuit 3 increases, whereby the duty cycle of the pulse signal Spw outputted by the PWM comparator 5 increases. As a result, the time in which the switching transistor M1 is on becomes longer. Correspondingly, the time in which the synchronous rectification transistor M2 is on becomes shorter, so that the output voltage Vout of the switching regulator 1 increases. By repeating such an operation, the output voltage Vout is controlled to stay at a predetermined voltage.

Thus, when the on/off signal ST is at low level and the switching regulator 1 is operating, the driver circuit 6 controls the on/off of the switching transistor M1 and the synchronous rectification transistor M2 in a complementary manner in accordance with the pulse width of the pulse signal Spw inputted from the PWM comparator 5. When the switching transistor M1 is on and the synchronous rectification transistor M2 is off, the inductor current iL increases, so that the voltage VLx at the connecting portion Lx is substantially equal to the input voltage Vin.

When the switching transistor M1 is off and the synchronous rectification transistor M2 is on, the inductor current iL decreases, so that the voltage VLx at the connecting portion Lx assumes a negative voltage.

When the on/off signal ST is at high level at time t1, the driver circuit 6 turns off both the switching transistor M1 and the synchronous rectification transistor M2 regardless of the input pulse signal Spw, thereby terminating the operation of the switching regulator 1. Because both the NMOS transistors M3 and M4 turn on, the energy stored in the inductor L1 is quickly consumed via the NMOS transistors M3 and M4. The charge in the output capacitor Co is quickly discharged via the NMOS transistor M3.

Although a large negative voltage (undershoot) develops at the connecting portion Lx due to the inverse electromotive force of the inductor L1, such undershoot is absorbed by the NMOS transistor M4. Thus, the development of undershoot is controlled. By making the impedance when the NMOS transistor M4 is on smaller than a forward impedance of the parasitic diode D1 of the synchronous rectification transistor M2, hardly any current flows through the parasitic diode D1, thereby preventing the destruction of the parasitic diode D1.

Thus, in the switching regulator according to the present embodiment, the development of undershoot immediately after the turning off of power supply can be controlled, and the output voltage Vout can be quickly lowered.

Embodiment 2

Figure 3:
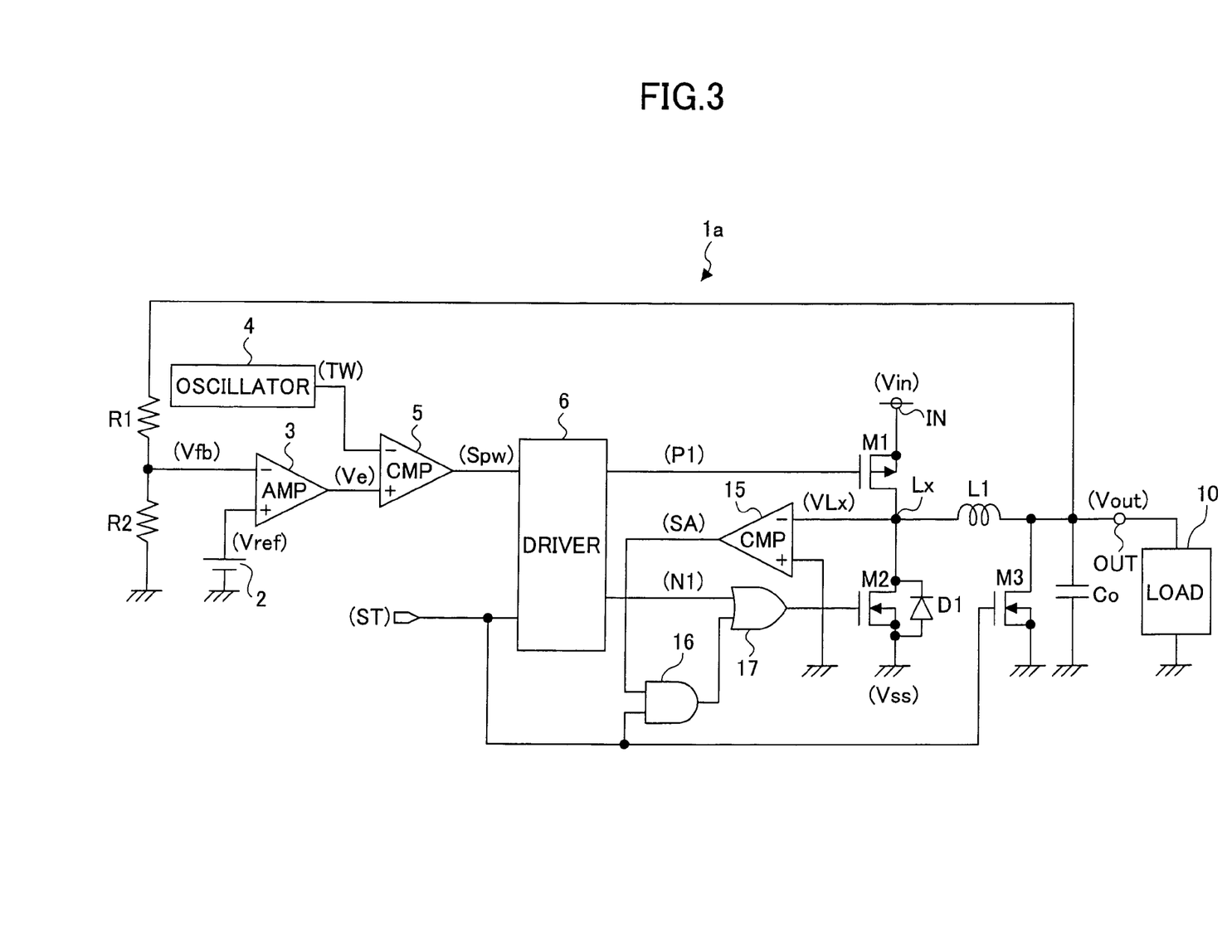
FIG. 3 shows a circuit diagram of a step-down switching regulator according to a second embodiment of the present invention.

FIG. 3 shows a circuit diagram of a step-down switching regulator according to a second embodiment of the present invention. In FIG. 3, parts identical or similar to those shown in FIG. 1 are referenced with similar numerals or signs, with the following description being directed only to different portions from the embodiment of FIG. 1.

The second embodiment in FIG. 3 differs from the first embodiment of FIG. 1 in that the NMOS transistor M4 is eliminated while a comparator 15, an AND circuit 16, and an OR circuit 17 are additionally provided.

In FIG. 3, the switching regulator 1a is a synchronous rectification type step-down switching regulator whereby an input voltage Vin at an input terminal IN is converted into a predetermined constant voltage to produce an output voltage Vout at an output terminal OUT that is applied to a load 10.

The switching regulator 1a includes a switching transistor M1; a synchronous rectification transistor M2; a reference voltage generating circuit 2; output-voltage-detecting resistors R1 and R2; an inductor L1; an output capacitor Co; an error amplifying circuit 3; an oscillating circuit 4; a PWM comparator 5; a driver circuit 6; and an NMOS transistor M3.

In addition, the switching regulator 1a includes the aforementioned comparator 15, AND circuit 16, and OR circuit 17.

The NMOS transistor M3 provides a first short-circuiting switching element as well as a short-circuiting unit. The comparator 15, the AND circuit 16, and the OR circuit 17 constitute a voltage detecting circuit unit. The individual circuits other than the inductor L1 and the capacitor C1 may be integrated into a single IC.

A non-inverting input terminal of the comparator 15 is connected to a ground voltage Vss, while its inverting input terminal is connected to a connecting portion Lx. The output terminal of the comparator 15 is connected to one input terminal of the AND circuit 16. The other input terminal of the AND circuit 16 is supplied with an on/off signal ST. The output terminal of the AND circuit 16 is connected to one input terminal of the OR circuit 17. The other input terminal of the OR circuit 17 is supplied with a control signal N1. The output terminal of the OR circuit 17 is connected to the gate of the synchronous rectification transistor M2.

Figure 4:
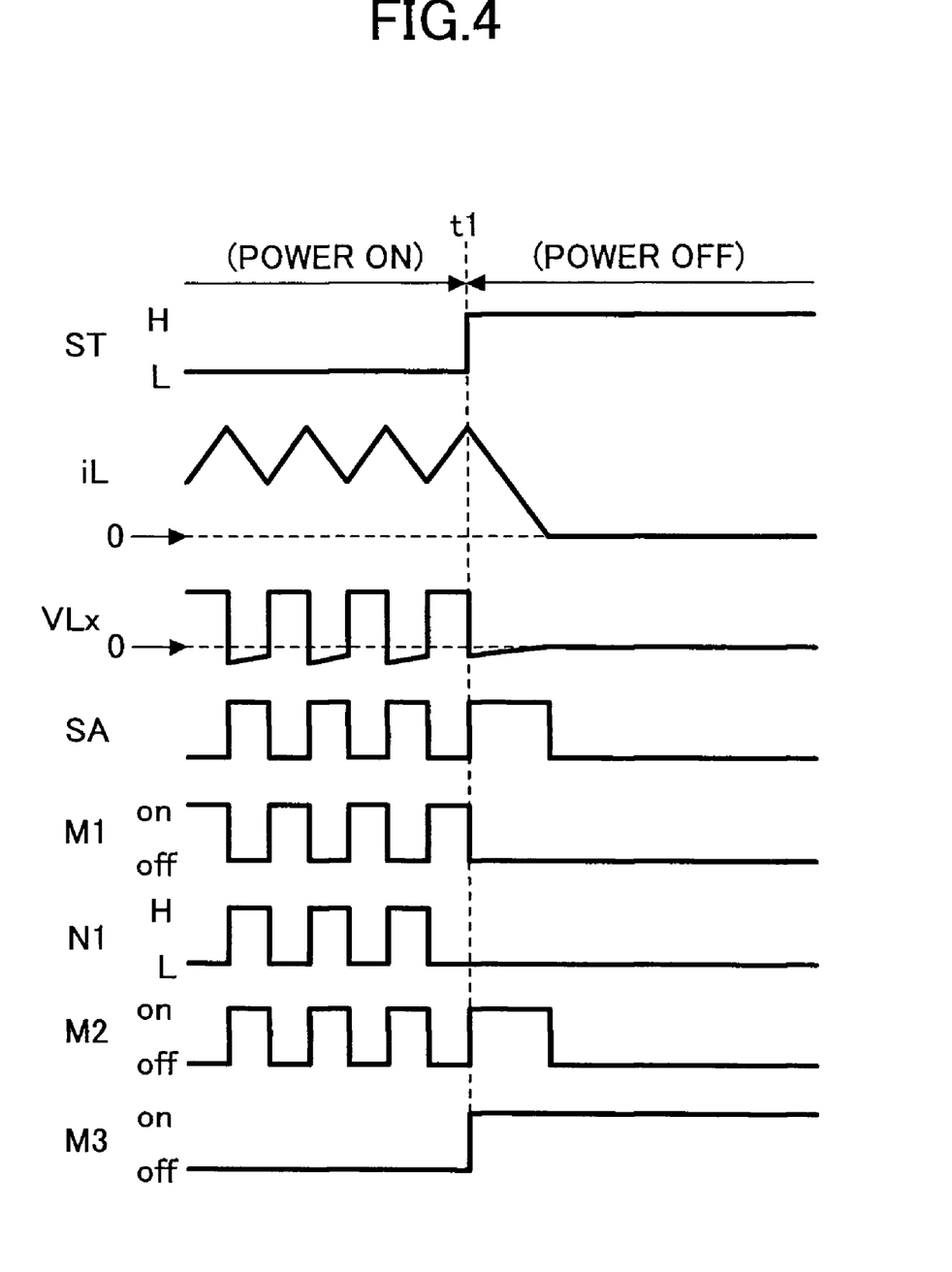
FIG. 4 shows a timing chart illustrating waveforms of various signals in the switching regulator shown in FIG. 3.

FIG. 4 shows a timing chart illustrating examples of the waveforms of the various signals in the switching regulator 1a shown in FIG. 3. M1 through M3 indicate the operation of the transistors M1 through M3. With reference to FIG. 4, an operation of the switching regulator 1a is described.

When the on/off signal ST is at a low level ("L") and the switching regulator 1a is activated, the output terminal of the AND circuit 16 is constantly at low level, so that the operation is identical to that of the switching regulator 1 shown in FIG. 1.

As the on/off signal ST has a high level ("H") at time t1, the driver circuit 6 produces and outputs the control signals P1 and N1 so that the switching transistor M1 and the synchronous rectification transistor M2 are both turned off. Because the switching transistor M1 is turned off, the switching regulator 1a ceases operating. At this time, the voltage VLx of the connecting portion Lx decreases to a negative voltage, so that the output signal SA of the comparator 15 assumes a high level. As a result, the AND circuit 16 outputs a signal with the same signal level as the signal level of the input on/off signal ST, i.e., a signal of high level.

Because the output terminal of the AND circuit 16 is connected to the input terminal of the OR circuit 17, the output signal of the OR circuit 17 also becomes high, thereby turning on the synchronous rectification transistor M2. Thus, the undershoot that develops at the connecting portion Lx due to the inverse electromotive force of the inductor L1 is absorbed by the synchronous rectification transistor M2, thus controlling the development of the undershoot. Further, because the NMOS transistor M3 performs in the same way as in the case of FIG. 1, the energy stored in the inductor L1 is consumed by the synchronous rectification transistor M2 and the NMOS transistor M3.

When all of the energy in the inductor L1 is drained, the voltage VLx of the connecting portion Lx assumes the ground voltage Vss, so that the output signal SA of the comparator 15 becomes low. Then, the output signal of the AND circuit 16 assumes low level, and so does the output signal of the OR circuit 17. Thus, the synchronous rectification transistor M2 turns off into a shutdown state.

Preferably, an offset voltage is provided for the input of the comparator 15 so that a low level signal can be reliably obtained at the output terminal of the comparator 15 when the inverting input terminal of the comparator 15 is at the ground voltage Vss.

Thus, in the switching regulator according to the present embodiment, the development of undershoot immediately after the turning off of power supply can be prevented by using the synchronous rectification transistor M2 in place of the NMOS transistor M4 that is used in the first embodiment. Thus, the output voltage Vout can be quickly lowered as in the first embodiment. Further, because the NMOS transistor M4 shown in FIG. 1 requires a large transistor with substantially the same size as the synchronous rectification transistor M2, the circuit area can be reduced and the chip size when integrated can be reduced even with the addition of the comparator 15, the AND circuit 16, and the OR circuit 17.

Embodiment 3

Figure 5:
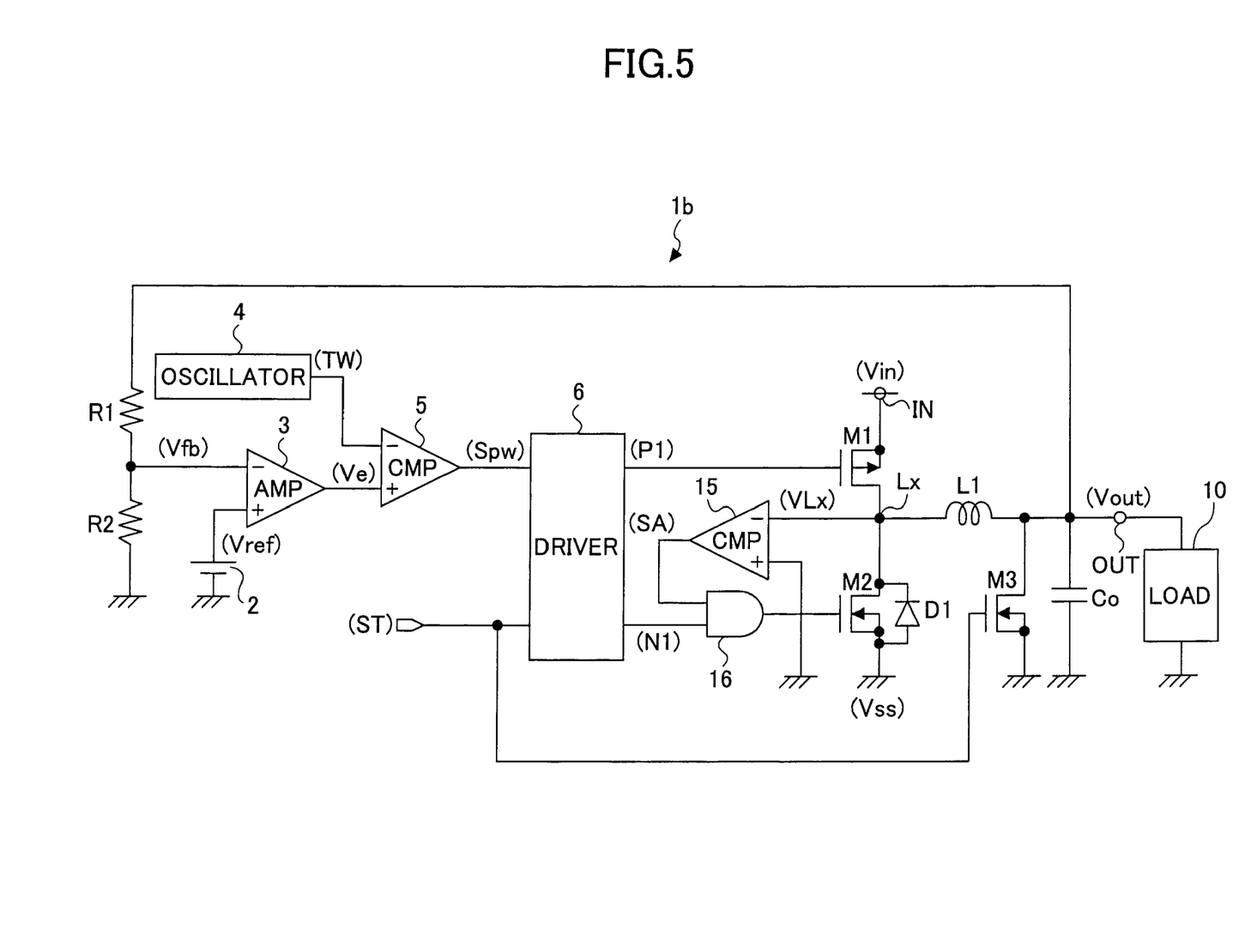
FIG. 5 shows a circuit diagram of a step-down switching regulator according to a third embodiment of the present invention.

FIG. 5 shows a circuit diagram of a step-down switching regulator according to a third embodiment of the present invention. In FIG. 5, parts identical or similar to those shown in FIG. 3 are designated with similar numerals, with the following description being directed only to the difference from the embodiment shown in FIG. 3.

The third embodiment shown in FIG. 5 differs from the second embodiment shown in FIG. 3 in that the OR circuit 17 is eliminated.

In FIG. 5, the switching regulator 1b is a synchronous rectification type step-down switching regulator whereby an input voltage Vin at an input terminal IN is converted into a predetermined constant voltage in order to produce an output voltage Vout at an output terminal OUT that is outputted to a load 10.

The switching regulator 1b includes a switching transistor M1; a synchronous rectification transistor M2; a reference voltage generating circuit 2; output-voltage-detecting resistors R1 and R2; an inductor L1; an output capacitor Co; an error amplifying circuit 3; an oscillating circuit 4; a PWM comparator 5; a driver circuit 6; an NMOS transistor M3; a comparator 15; and an AND circuit 16.

The NMOS transistor M3 provides a first short-circuiting switching element as well as a short-circuiting unit. The comparator 15 and the AND circuit 16 constitute an inverse current detection circuit unit. The individual circuits other than the inductor L1 and the capacitor C1 may be integrated into a single IC.

One input terminal of the AND circuit 16 is supplied with a control signal N1 from the driver circuit 6. The output terminal of the AND circuit 16 is connected to the gate of the synchronous rectification transistor M2. The comparator 15 and the AND circuit 16 constitute an inverse current detection circuit.

Figure 6:
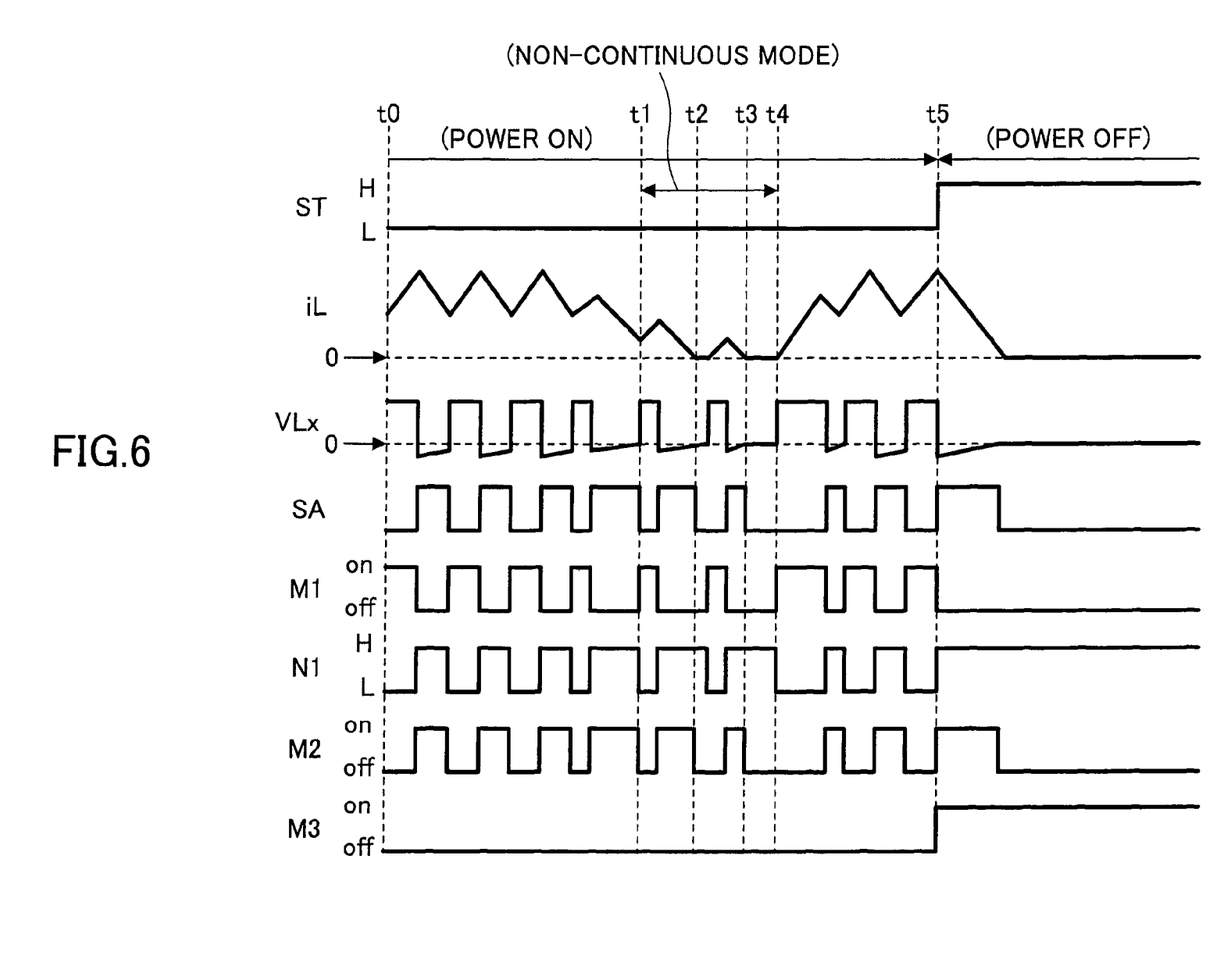
FIG. 6 shows a timing chart illustrating waveforms of various signals in the switching regulator shown in FIG. 5.

FIG. 6 shows a timing chart illustrating examples of waveforms of various signals in the switching regulator 1b shown in FIG. 5. M1 through M3 indicate the operation of each of the transistors M1 through M3.

With reference to FIG. 6, an operation of the switching regulator 1b is described. Initially, a case is considered in which the on/off signal ST is at low level and the switching regulator 1b is operating in a continuous mode.

The interval between time t0 and time t1 and the interval between time t4 and time t5 are the continuous mode operating intervals. In these operating intervals, the voltage VLx of the connecting portion Lx when the switching transistor M1 is on and the synchronous rectification transistor M2 is off is close to the input voltage Vin, so that the output signal SA of the comparator 15 becomes low. When the switching transistor M1 is off and the synchronous rectification transistor M2 is on, the voltage VLx at the connecting portion Lx assumes a negative voltage, so that the output signal SA of the comparator 15 becomes high. Thus, the AND circuit 16 outputs a signal with the same signal level as that of the control signal N1 supplied from the driver circuit 6 to the gate of the synchronous rectification transistor M2.

Next, a case is considered where the switching regulator 1b is operating in a non-continuous mode.

The interval between time t1 and time t4 is the non-continuous mode operating interval. In this operating interval, when the switching transistor M1 is on and the synchronous rectification transistor M2 is off, the voltage VLx of the connecting portion Lx is close to the input voltage Vin, as in the continuous mode, so that the output signal SA of the comparator 15 becomes low.

When the switching transistor M1 is off and the synchronous rectification transistor M2 is on, the energy stored in the inductor L1 flows from the ground voltage Vss to the output terminal OUT via the synchronous rectification transistor M2 that is on and the inductor L1. The inductor current iL decreases as the energy stored in the inductor L1 decreases, whereby the voltage VLx at the connecting portion Lx gradually increases from a negative voltage.

At time t2 or time t3, the entire energy stored in the inductor L1 is discharged, so that the voltage VLx at the connecting portion Lx assumes the ground voltage Vss. As the on-time of the synchronous rectification transistor M2 is further extended, the direction of flow of the inductor current iL is reversed; i.e., it flows from the output terminal OUT to the ground voltage Vss via the inductor L1 and the synchronous rectification transistor M2. Thus, the voltage VLx at the connecting portion Lx becomes a positive voltage, and the output signal SA of the comparator 15 becomes low. As a result, the output signal of the AND circuit 16 also becomes low, whereby the synchronous rectification transistor M2 is turned off. Thus, the development of the reverse current from the output terminal OUT to the synchronous rectification transistor M2 can be prevented.

As the on/off signal ST becomes high at time t5, the driver circuit 6 turns off the switching transistor M1 and turns on the synchronous rectification transistor M2. This state is identical to the state where the switching transistor M1 is turned off when the switching regulator 1 is activated. Namely, the energy stored in the inductor L1 flows to the output terminal OUT via the synchronous rectification transistor M2 and the inductor L1, resulting in a gradual increase in the voltage VLx of the connecting portion Lx. When the entire energy stored in the inductor L1 is drained and the voltage VLx at the connecting portion Lx becomes the ground voltage Vss, the signal level of the output signal SA of the comparator 15 is inverted to low level. Consequently, the output signal of the AND circuit 16 also becomes low, whereby the synchronous rectification transistor M2 is turned off.

Thus, in the switching regulator according to the third embodiment, during the detection of the inverse current by the inverse current detection circuit, the synchronous rectification transistor M2 turns on to consume, together with the NMOS transistor M3 that is on, the energy in the inductor L1, as in the second embodiment. Thus, the undershoot of the output voltage Vout can be controlled and the output voltage Vout can be quickly lowered. Furthermore, by employing the inverse current detection circuit to prevent the undershoot in the output voltage Vout, addition of circuitry can be minimized.

In the third embodiment, the synchronous rectification transistor M2 is turned off directly by the output signal of the inverse current detection circuit. Preferably, the output signal of the inverse current detection circuit may be inputted to the driver circuit 6 so that the synchronous rectification transistor M2 can be turned off by the control signal N1 outputted by the driver circuit 6. Preferably, as in the second embodiment, an offset voltage is provided to the input of the comparator 15.

Although this invention has been described in detail with reference to certain embodiments, variations and modifications exist within the scope and spirit of the invention as described and defined in the following claims.

The present application is based on the Japanese Priority Application No. 2008-046023 filed Feb. 27, 2008, the entire contents of which are hereby incorporated by reference.

What is claimed is:

1. A synchronous-rectification-type step-down switching regulator for converting an input voltage at an input terminal of the switching regulator into a predetermined constant voltage that is applied to a load connected at an output terminal of the switching regulator, the switching regulator comprising:
a first switching element configured to perform a switching in accordance with a control signal;
an inductor that is charged by the input voltage when the first switching element performs the switching;
a second switching element for synchronous rectification configured to discharge the inductor by performing a switching in accordance with the control signal;
a control circuit unit configured to control the switching of the first switching element in order to obtain the predetermined constant voltage at the output terminal, the control circuit also being configured to cause the second switching element to perform the switching in an opposite manner to the switching of the first switching element; and
a short-circuiting unit configured to connect the output terminal to a ground voltage and also short-circuit the second switching element when the control circuit unit is deactivated.

2. The step-down switching regulator according to claim 1, wherein the short-circuiting unit includes:
a first short-circuiting switching element connected between the output terminal and the ground voltage; and
a second short-circuiting switching element connected in parallel with the second switching element,
wherein, upon reception of an external signal to terminate the operation of the control circuit unit, the first short-circuiting switching element connects the output terminal to the ground voltage while the second short-circuiting switching element short-circuits the second switching element.

3. A synchronous-rectification-type step-down switching regulator for converting an input voltage at an input terminal of the switching regulator into a predetermined constant voltage that is applied to a load connected at an output terminal of the switching regulator, the switching regulator comprising:
a first switching element configured to perform a switching in accordance with a control signal;
an inductor that is charged by the input voltage when the first switching element performs the switching;
a second switching element for synchronous rectification configured to discharge the inductor by performing a switching in accordance with the control signal;
a control circuit unit configured to control the switching of the first switching element in order to obtain the predetermined constant voltage at the output terminal, the control circuit also being configured to cause the second switching element to perform the switching in an opposite manner to the switching of the first switching element;
a short-circuiting unit configured to connect the output terminal to a ground voltage when the control circuit unit is deactivated; and
a voltage detecting circuit unit configured to detect a voltage at a connecting portion between the inductor and the second switching element,
wherein the voltage detecting circuit unit, when the voltage at the connecting portion between the inductor and the second switching element is a negative voltage, turns on the second switching element into a conducting state upon reception of an external signal for terminating the operation of the control circuit unit.

4. The step-down switching regulator according to claim 3, the short-circuiting unit includes a first short-circuiting switching element connected between the output terminal and the ground voltage,
wherein the first short-circuiting switching element connects the output terminal to the ground voltage upon reception of the external signal for terminating the operation of the control circuit unit.

5. A synchronous-rectification-type step-down switching regulator for converting an input voltage at an input terminal of the switching regulator into a predetermined constant voltage that is applied to a load connected at an output terminal of the switching regulator, the switching regulator comprising:
a first switching element configured to perform a switching in accordance with a control signal;
an inductor that is charged by the input voltage when the first switching element performs the switching;

a second switching element for synchronous rectification configured to discharge the inductor by performing a switching in accordance with the control signal;

a control circuit unit configured to control the switching of the first switching element in order to obtain the predetermined constant voltage at the output terminal, the control circuit also being configured to cause the second switching element to perform the switching in an opposite manner to the switching of the first switching element;

a short-circuiting unit configured to connect the output terminal to a ground voltage when the control circuit unit is deactivated; and an inverse current detection circuit unit configured to turn off the second switching element into a shutdown state upon detection of an inverse current that flows from the output terminal to the second switching element, wherein, upon reception of an external signal for terminating the operation of the control circuit unit, the inverse current detection circuit unit turns on the second switching element into a conducting state when a voltage at a connecting portion between the inductor and the second switching element is a negative voltage.

* * * * *